United States Patent [19]

Evin

[11] 4,326,197

[45] Apr. 20, 1982

[54] PROXIMITY DETECTOR

[75] Inventor: Jean Evin, Pont a Marcq, France

[73] Assignee: Societe Logilift S.A.R.L., Lille, France

[21] Appl. No.: 133,670

[22] Filed: Mar. 25, 1980

[30] Foreign Application Priority Data

Mar. 28, 1979 [FR] France ................... 79 08410

[51] Int. Cl.³ .................. G08B 13/24; G08B 13/22
[52] U.S. Cl. .......................... 340/561; 49/31; 307/116; 340/552
[58] Field of Search ............... 340/561, 552, 568, 679; 49/31; 307/125, 116

[56] References Cited

U.S. PATENT DOCUMENTS

| 2,720,284 | 10/1955 | Galanty | 187/48 |
| 3,018,851 | 1/1962 | Diamond et al. | 187/48 |
| 3,439,358 | 4/1969 | Salmons | 340/552 |
| 3,496,381 | 2/1970 | Wisnia | 49/31 |
| 3,497,995 | 3/1970 | Forsberg | 49/31 |
| 3,794,992 | 2/1974 | Gehman | 340/552 |
| 3,953,770 | 4/1976 | Hayashi | 361/179 |
| 4,191,894 | 3/1980 | Noda et al. | 307/116 |
| 4,208,695 | 6/1980 | Noda et al. | 307/116 |

*Primary Examiner*—Glen R. Swann III
*Attorney, Agent, or Firm*—Kerkam, Stowell, Kondracki & Clarke

[57] ABSTRACT

A proximity detector processes voltages induced across the sections of at least one antenna.

The antenna sections are each connected to means (30, 31 and 36 to 39) for rectifying the positive and negative alternations of the alternating signal providing two first and second signals relating, one, to the "peak" value of the voltage induced across the section whose voltage is the highest and, the other, to the mean value of the voltage across the various sections, the first signal supplying an adder controlled by a gate and the second signals are supplied to another input of the adder led by a limiter said means being, in turn, connected to means (21, 22) for analyzing these two signals.

The detector may be used with elevator doors.

4 Claims, 3 Drawing Figures

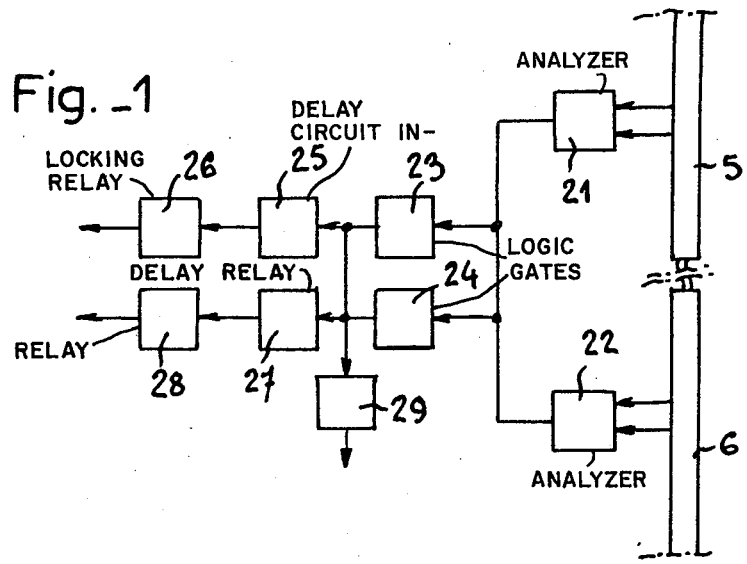
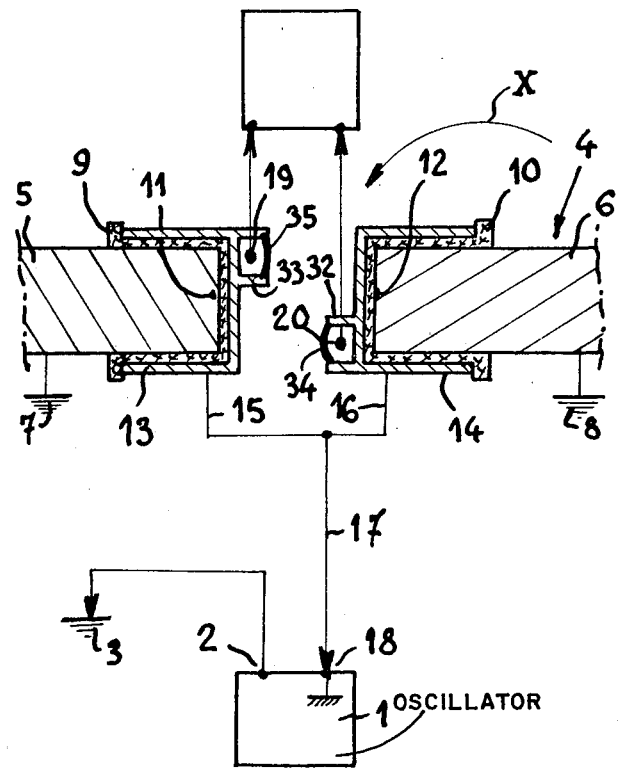

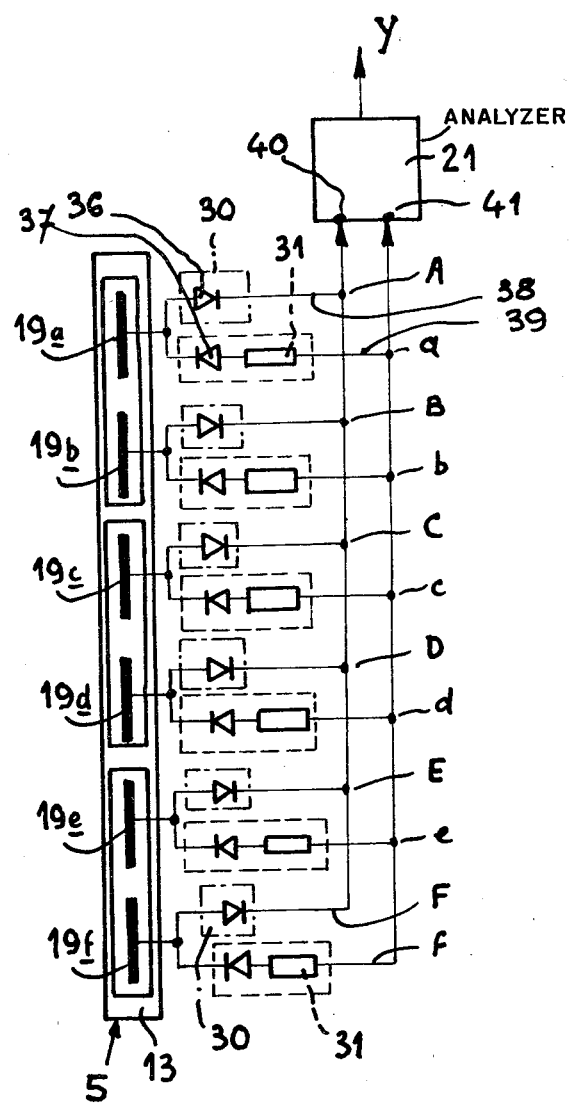
Fig. _2

PROXIMITY DETECTOR

DESCRIPTION

BACKGROUND OF THE INVENTION

The invention relates to a proximity detector whose object is to reveal the presence of an object at a certain distance from an element, as, for example, of an intruder in the proximity of a building entrance or of an obstacle in the trajectory of a moving body such as the tool of a press.

While not exclusively, it relates more particularly to the application of this detector to the vertical edges of power operated doors and especially to hoistway doors and/or doors of elevators and hoists. In this particular application, the object is obviously to detect the presence of a person or of an object that might be injured while the door is still at a certain distance, so that, as a result of the signal emitted by this detector, is is possible to block the door and thus to interrupt its closing or even effect its reopening if the level of this signal exceeds a certain threshold.

For this application to the reopening of elevator doors, there already exists various devices tending to limit if not to prevent damage. In particular:

strain detectors, which however detect the presence of the person or of the object only by running into it;

pneumatic feelers which, while very sensitive, are also very fragile;

photoelectric cells, whose area of sensitivity is limited to the sector scanned by the beam of light;

radars which, in addition to being very expensive, present the drawback of not being selective.

Proximity detectors are also known (U.S. Pat. No. 3,018,851) comprising a very low-frequency low-energy oscillator whose emission point is grounded so as to emit a signal of constant amplitude and frequency, at least one receiving antenna, divided into several independent sections, mounted on the part of the element whose approach is being monitored but located outside the direct radiation field of the elements that surround this part and which are grounded but which maintain an unvarying distance from said part, and a processing circuit for the voltage induced in each section of the receiving antenna by the waves reflected and radiated by the bodies that surround the antenna, so as to emit a final signal whose intensity will be modified by the presence of a foreign object in proximity of said antenna.

Detectors of this type operate by reading differences in the capacitive coupling to the ground of each antenna section and are well suited to solve the problem of detecting an obstacle to the closing of the doors. Unfortunately, in detectors of this type known to date, the processing of the signals emitted by the antenna sections operates by balancing a bridge circuit (U.S. Pat. Nos. 3,018,851 and 2,720,284), as a result of which the system is very unstable and requires complex adjustment. That is why one result that the present invention achieves is a very stable detector, which is simple to adjust, inexpensive and easily mounted on the element in whose proximity is to be detected the approach of any body and, for example, on specially designed or already existing doors.

SUMMARY OF THE INVENTION

To this end, an object of this invention is a detector of the type described above, in which the antenna sections are each connected to means for rectifying the positive and negative alternations of the alternating signal received by it. Each of these means delivers into distinct circuits two first and second signals. All of the circuits of the first signals, which are emitted by the positive alternations, are connected to one of the inputs of an adder which is controlled by a gate actually transmitting to this input only the first signal emitted by the section whose voltage is highest. All the circuits of the second signals, which are emitted by the negative alternations, are connected to the other input of the adder control led by a limiter, so as to transmit to this input only the sum of the second signals divided by the number of sections.

Another object of this invention is the structural elements equipped with this detector.

BRIEF DESCRIPTION OF THE DRAWINGS

The present invention will be clearly understood from the following description of a non-restrictive example illustrated by the accompanying drawings of a preferred embodiment thereof applied to an elevator door in which:

FIG. 1 is a block diagram of the assembly receiving the signals;

FIG. 2 is a symbolic diagram of a processing circuit for the signals emitted by the antennas; and FIG. 3 is a cross-section view of the door edges equipped with the detector.

DESCRIPTION OF THE PREFERRED EMBODIMENT

Referring to the drawings, it can be seen that the device comprises an oscillator 1 of very low frequency (FIG. 3), such as 8 kilohertz, and low energy, whose emission point 2 is connected to the ground 3 so as to emit to the latter a sinusoidal signal of constant amplitude and, secondarily, of constant frequency. As a result, any approaching person, being necessarily more or less connected to the ground, receives energy which the device radiates to its immediate surroundings in the form of electromagnetic waves.

The same is true of any metallic object connected to the ground as, in the present example, an elevator door 4 having panels 5, 6 grounded at 7, 8. The edges 11, 12 of the panels are then equipped with a metal shield 13, 14, for example of aluminum, after insertion of a layer of any type of known insulating material 9, 10.

Shields 13, 14 are connected at 18 to the reference voltage of oscillator 1 by connectors 15, 16, 17. In front of each shield 13, 14 thus, outside the direct radiation field of panels 5, 6 each door edge is provided with an antenna 19, 20, divided into several independent sections, for example into six sections 19a and 19f (FIG. 2).

These antenna sections receive only reflected waves from certain bodies and mainly waves radiated by other bodies which are more or less coupled to ground or which emit a part of their induced potential.

In the absence, within the wave field, of riders or objects and in general of any foreign body, the waves thus reflected and/or radiated by the permanently mounted parts act on the various antenna sections in proportions that remain constant.

The moment a foreign body is in the proximity of one of the antenna sections, the foreign body radiates or reflects upon this section a field of higher value. This then modifies the intensity of reception of this antenna section and of its output signal. The closer the foreign body, the stronger this effect.

The processing in an analyzer 21, 22 of the variations in the proportion of the output signals of the antenna sections permits the detection and evaluation of the more or less immediate proximity of the foreign body.

Before analysis, the output signals can obviously be adjusted to a predetermined level so that all are equal in the absence of foreign bodies.

In order to evaluate the distance of the object and, therefore, the urgency of intervening, the signal is fed to two logic gates 23, 24 (FIG. 1) acting as triggers adjusted to different thresholds, the first one controlling through a delay circuit 25 a blocking relay 26 for the gates, while the other one similarly controls through a delay relay 27 the relay 28 that reopens the gates.

A time relay 29 detects the duration of the blocking or reopening signals beyond a pre-set time and activates an alarm.

In accordance with a characteristic of the present invention, the antenna sections are connected to means for the sampling of two distinct signals, one of which relates to the peak level of the voltage induced across the section whose voltage is highest, and the other relates to the mean value of the voltages in all the sections, as well as to means for comparing these two signals.

In the preferred embodiment, these means of sampling and analyzing comprise means 36, 37 (FIG. 2) to rectify the positive and negative alternations of the alternating signal it receives, such as diodes.

Means 36, 37 produce signals in the distinct circuits 38, 39 which are:

a first signal "A" to "F" for the positive alternations,
a second signal "a" to "f" for the negative alternations, where, owing to an initial adjustment, and in the absence of any foreign body, a=A, b=B, c=C, d=D, f=F.

All the circuits 38 connected to gates 30 of the first signals, which are produced by the positive alternations, are connected to one of the inputs 40 of the comparator 21, such as an operational amplifier controlled by gate 30 (FIG. 2), so as to actually transmit to input 40 only the value of the first signal A, or B, or C, or D, or E, or F, emitted by the section whose voltage is the highest.

All of the circuits 39 of the second signals, which are produced by negative alternations, are connected to the other input 41 of the comparator 21 controlled by a limiter 31, such as a resister. Each limiter 31 is selected so as to pass 1/6 of the voltage normally present, and the mean value of the voltage of the various signals of the present example delivered to input 41 under normal condition is the sum of these 1/6 voltages of the signals a,b,c,d,e,f.

Comparator 21 then adds these two distinct signals and, because of the initial adjustment described above, which is carried out in the absence of a foreign body, and since the signals A to F and a to f of the antenna sections are adjusted to be identical, the detections of the positive and negative alternations balance each other and the output signal Y is equal to zero.

For example, if the effect of external conditions is represented by x, either:

$$Y = x\left( A \text{ or } B \text{ or } C \text{ or } D \text{ or } E \text{ or } F + \frac{a}{6} + \frac{b}{6} + \frac{c}{6} + \frac{d}{6} + \frac{e}{6} + \frac{f}{6} \right)$$

or $$Y = x\left[ A \text{ or } B \text{ or } C \text{ or } D \text{ or } E \text{ or } F + \left( -\frac{A}{6} - \frac{B}{6} - \frac{C}{6} - \frac{D}{6} - \frac{E}{6} - \frac{F}{6} \right) \right] \text{ in the absent of foreign bodies}$$

and, since all of the signals A to F are identical, $$Y = x\left( A - \frac{6 \cdot A}{6} \right) = 0$$

The moment a foreign body approaches, the signals received by the various sections are different, for example:

$$a = -2, b = -2, c = -2, d = -2, e = -1, f = -1.$$

At the output of comparator 21, signal Y will then equal:

$$Y = x\left( 2 - \frac{10}{6} \right) = \frac{2 \cdot x}{6}$$

In this preferred embodiment, gate 30 has diodes 36 which, as is known, allow only the peak value to pass, providing they are not otherwise blocked, being connected at their bases, by a higher signal emitted by another diode.

Because of the division of the antenna into several sections and because of the way the signals are processed, signal Y emitted by comparator 21 has the advantage of being increased and, when equilibrium is achieved, of being practically unaffected by any conditions external to the operation, which results in high detection stability.

In the embodiment described here involving a door composed of two moving panels, two antennas 19, 20 are used divided into several sections but, obviously, in the case of a door having only one moving panel, there will be but one antenna 19. However, there will be a shield on the two vertical edges defining the opening, on the edge of the mobile panel and on the edge of the fixed panel or upright, so that the upright will not radiate directly toward the antenna when the door is completely or nearly closed.

In the preferred embodiment, the metal shield forms a U-shaped channel capping the edge of the door panel or of the upright and having an external fitting 32, 33 hollowed out to house the antenna and closed at the front by a plate 34, 35 that is transparent to the electric waves.

In accordance with another characteristic of the present invention, fittings 32, 33 housing the antenna of the two panels of a door are less than half the width of the shield and are staggered with respect to each other. Thus, each flanks one of the sides of the panel, and they are positioned side by side when the door is in closed position.

What I claim is:
1. Proximity detector for revealing the presence of a body at a certain distance from an element (5, 6) detecting the body comprising an oscillator (1) whose emission point (2) is connected to the ground (3) so as to transmit to the latter a signal of constant amplitude and frequency;

at least one monitoring antenna (19, 20) divided into several independent sections, mounted on the part (11, 12) of said element (5, 6) whose approaches are being monitored, but located outside of the direct radiation field of the elements coupled to ground which normally surround this part and act indirectly on said antenna sections;

a processing circuit for the voltages induced across each monitoring antenna section by the waves simultaneously reflected and radiated by the bodies normally surrounding the antenna as well as by any foreign body, said processing circuit functioning to emit a final signal whose intensity is modified by the existence of a foreign body in the proximity of said antenna, the antenna sections being connected to means (30, 31 and 36 to 39) in said processing circuit for sampling two distinct signals relating, one, to the "peak" value of the voltage induced across the section whose voltage is the highest and, the other, to the mean value of the voltage across the various sections, which sampling means is in turn connected to means (21, 22) of analyzing these two signals.

2. Detector in accordance with claim 1, said sampling and analyzing means of said processing circuit comprising means (36, 37) connected to each of the antenna sections for rectifying the positive and negative alternations of the alternating signal received by them, each of said means providing two signals, first and second signals, to distinct circuits (38, 39), the circuits (38) of the first signals, produced by the positive alternations, being connected to one of the inputs (40) of said analysis means (21) under the control of a gate (30) transmitting to this input only the first signal emitted by the section whose voltage is the highest, all of the circuits (39) of the second signals, produced by the negative alternations, being connected to the other input (41) of said analysis means (21) under the control of a limiter (31) so as to transmit to this input only the sum of the second signals divided by the number of sections.

3. Detector in accordance with claim 1, applied to a door (4) having two vertical edges (11, 12) forming an opening, said edges being formed by the edges of two panels (5, 6) at least one of said panels being a moving panel, a shield (13,14) being formed by a U-shaped channel capping the edge of the corresponding panel and carrying an external hollow fitting (32, 33) to house the antenna.

4. Detector in accordance with claim 3, said fitting (32, 33) housing the antenna being at most half the width of said channel (13, 14) and, in a door composed of two moving panels there being, two hollow fittings, each flanking a distinct side of the door.

* * * * *